(12) United States Patent
Anderson

(10) Patent No.: US 10,840,589 B2
(45) Date of Patent: Nov. 17, 2020

(54) MULTI-BAND MIMO PANEL ANTENNAS

(71) Applicant: TAOGLAS GROUP HOLDINGS LIMITED, Enniscorthy, County Wexford (IE)

(72) Inventor: Christopher M. Anderson, Minneapolis, MN (US)

(73) Assignee: TAOGLAS GROUP HOLDINGS LIMITED, Enniscorthy (IE)

( * ) Notice: Subject to any disclaimer, the term of this patent is extended or adjusted under 35 U.S.C. 154(b) by 0 days.

(21) Appl. No.: 15/689,349

(22) Filed: Aug. 29, 2017

(65) Prior Publication Data

US 2018/0069305 A1    Mar. 8, 2018

Related U.S. Application Data

(60) Provisional application No. 62/383,110, filed on Sep. 2, 2016.

(51) Int. Cl.
| | |
|---|---|
| *H01Q 1/42* | (2006.01) |
| *H01R 13/52* | (2006.01) |
| *H01Q 21/28* | (2006.01) |
| *H01Q 1/32* | (2006.01) |
| *H04B 7/0413* | (2017.01) |

(52) U.S. Cl.
CPC ............ *H01Q 1/42* (2013.01); *H01Q 1/3283* (2013.01); *H01Q 21/28* (2013.01); *H01R 13/5208* (2013.01); *H04B 7/0413* (2013.01)

(58) Field of Classification Search
USPC ........................ 361/730, 733; 343/872, 873
See application file for complete search history.

(56) References Cited

U.S. PATENT DOCUMENTS

| | | | | |
|---|---|---|---|---|
| 4,743,917 | A | * | 5/1988 | Huntsman ............... H01Q 1/087 242/388.6 |
| 5,936,587 | A | | 8/1999 | Gudilev et al. |
| 5,959,581 | A | * | 9/1999 | Fusinski ............... H01Q 1/1271 343/700 MS |
| 6,842,148 | B2 | | 1/2005 | Hendler et al. |
| D522,531 | S | | 6/2006 | Solomon et al. |
| D572,250 | S | | 7/2008 | Yang |
| 7,408,512 | B1 | | 8/2008 | Rodenbeck et al. |
| 7,411,554 | B2 | | 8/2008 | Jung et al. |
| 7,714,795 | B2 | | 5/2010 | Wen et al. |
| D617,323 | S | | 6/2010 | Willenz |

(Continued)

FOREIGN PATENT DOCUMENTS

| | | |
|---|---|---|
| CN | 302414907 S | 4/2013 |
| CN | 203631720 U | 6/2014 |

(Continued)

*Primary Examiner* — Howard Williams
(74) *Attorney, Agent, or Firm* — Garson & Gutierrez, PC

(57) ABSTRACT

Described are multi-band panel antennas which are configurable to have heavy-duty construction and which are fully IP67 waterproof. Suitable applications for the disclosed antennas include internet of things (IoT) gateway and IoT routers, HD video streaming, transportation, and remote monitoring applications. Additionally, the antennas can deliver MIMO coverage technology for worldwide 4G LTE bands at 698 to 960 MHz/1710 to 2170 MHz/2490 to 2690 MHz/3300 to 3600 MHz, Satellite Band, dual-band 2.4/5.8 GHz WiFi, and GNSS (GPS-GLONASS-BeiDou).

20 Claims, 8 Drawing Sheets

(56) References Cited

U.S. PATENT DOCUMENTS

| | | | |
|---|---|---|---|
| D630,198 S | 1/2011 | Wilkens et al. | |
| D661,698 S | 6/2012 | Chaturvedi et al. | |
| 8,952,850 B2 | 2/2015 | Park et al. | |
| D735,179 S | 7/2015 | Yang | |
| D749,577 S | 2/2016 | Lin et al. | |
| D755,132 S | 5/2016 | Kashimoto | |
| D755,734 S | 5/2016 | Kashimoto | |
| 9,413,069 B2 | 8/2016 | Chieh et al. | |
| D782,476 S | 3/2017 | Yamazaki | |
| D783,610 S | 4/2017 | Zhou | |
| D784,308 S | 4/2017 | Buel et al. | |
| 2007/0236404 A1* | 10/2007 | Snider | H01Q 1/3233 343/872 |
| 2010/0182206 A1* | 7/2010 | Barbieri | H01Q 1/2291 343/702 |
| 2011/0109522 A1 | 5/2011 | Merrick et al. | |
| 2012/0127056 A1 | 5/2012 | Park et al. | |
| 2015/0123854 A1* | 5/2015 | Chakam | H01Q 1/1214 343/702 |
| 2016/0109678 A1 | 4/2016 | Schwengler et al. | |

FOREIGN PATENT DOCUMENTS

| | | |
|---|---|---|
| CN | 303377608 S | 9/2015 |
| GB | 2556156 A | 5/2018 |
| JP | 2006096079 A | 4/2006 |
| WO | 2013048823 A1 | 4/2013 |

* cited by examiner

| Beidou-GPS-GLONASS ||
|---|---|
| CENTER FREQUENCY | Beidou:1561.098±2.046 MHz<br>GPS:1575.42±1.023 MHz<br>GLONASS:1602±5 MHz |
| PASSIVE ANTENNA EFFICIENCY (WITHOUT CABLE LOSS) | Beidou: 63%<br>GPS: 48%<br>GLONASS: 57% |
| PASSIVE ANTENNA AVERAGE GAIN(WITHOUT CABLE LOSS) | Beidou: -1.97dBi<br>GPS: -3.13dBi<br>GLONASS: -2.39dBi |
| PASSIVE ANTENNA PEAK GAIN(WITHOUT CABLE LOSS) | Beidou: 3dBi<br>GPS: 1.98dBi<br>GLONASS: 3.01dBi |
| VSWR | 3:1 mAX |
| IMPEDANCE | 50Ω |
| AXIAL RATIO | Beidou:<9.7<br>GPS:<14.02<br>GLONASS:<5.9 |
| POLARIZATION | RHCP |
| CABLE | 1 METER RG174 STANDARD, FULLY CUSTOMIZABLE |
| CONNECTOR | SMA(M), STANDARD, FULLY CUSTOMIZABLE |
| LNA AND FILTER ELECTRICAL PROPERTIES ||

| | | | | |
|---|---|---|---|---|
| CENTER FREQUENCY | Beidou: 1561.098±2.046 MHz<br>GPS:1575.42±1.023 MHz<br>GLONASS:1602±5 MHz ||||
| OUTPUT IMPEDANCE | 50 Ohm ||||
| VSWR | < 2:1 ||||
| RETURN LOSS | 10 dB MIN. ||||
| GAIN, CURRENT DRAW, AND NOISE FIGURE@GPS | VOLTAGE | LNA GAIN(TYP) | CURRENT DRAW(mA) TYP | NOISE FIGURE(TYP) |
| | TYP 3.0V | 30 dB | 9.0 mA | 1.13 dB |
| | TYP 5.5V | 33 dB | 9.9 mA | 1.14 dB |
| TOTAL SPECIFICATION(THROUGH ANTENNA, SAW FILTER, AND LNA) |||||
| FREQUENCY | 1561.098±2.046 MHz | 1575.42±1.023 MHz || 1602±5 MHz |
| GAIN@3V | 1561MHz:28±3dBi | 1575.42MHz:28±3dBi || 1602MHz:28±3dBi |
| OUTPUT IMPEDANCE | 50Ω ||||

FIG. 2

| 2G/3G/4G LTE ANTENNA ||||||||||
|---|---|---|---|---|---|---|---|---|---|
| FREQUENCY (MHz) || LTE700 | GSM850 | GSM900 | DCS | PCS | UMTS1 | LTE2600 | LTE3500 |
| || 698~803 | 824~894 | 880~960 | 1710~1880 | 1850~1990 | 1920~2170 | 2490~2690 | 3300~3600 |
| EFFICIENCY (%) ||||||||||
| MIMO_1 | 30cm | 80.59 | 64.37 | 61.48 | 67.87 | 72.91 | 76.16 | 47.65 | 55.23 |
| | 1M | 76.15 | 61.48 | 58.71 | 61.90 | 66.50 | 70.02 | 43.45 | 49.00 |
| | 2M | 71.06 | 56.46 | 53.55 | 55.17 | 58.52 | 61.35 | 37.52 | 41.47 |
| | 3M | 65.87 | 52.33 | 49.65 | 49.03 | 51.74 | 54.25 | 32.54 | 35.03 |
| | 5M | 56.97 | 44.54 | 41.98 | 38.65 | 40.59 | 42.27 | 24.39 | 25.12 |
| MIMO_2 | 30cm | 80.00 | 63.77 | 59.51 | 67.36 | 72.20 | 76.03 | 57.82 | 64.24 |
| | 1M | 75.66 | 60.90 | 56.84 | 61.43 | 65.84 | 69.92 | 52.74 | 56.94 |
| | 2M | 70.61 | 55.93 | 51.83 | 54.75 | 57.94 | 61.24 | 45.51 | 48.21 |
| | 3M | 65.44 | 51.84 | 48.09 | 48.66 | 51.23 | 54.16 | 39.45 | 40.77 |
| | 5M | 56.55 | 44.12 | 40.66 | 38.36 | 40.18 | 42.20 | 29.58 | 29.22 |
| AVERAGE GAIN (dBi) ||||||||||
| MIMO_1 | 30cm | -0.95 | -1.92 | -2.11 | -1.69 | -1.37 | -1.19 | -3.42 | -2.64 |
| | 1M | -1.19 | -2.12 | -2.31 | -2.09 | -1.77 | -1.55 | -3.82 | -3.17 |
| | 2M | -1.49 | -2.49 | -2.71 | -2.59 | -2.33 | -2.13 | -4.45 | -3.89 |
| | 3M | -1.82 | -2.82 | -3.04 | -3.10 | -2.86 | -2.66 | -5.08 | -4.62 |
| | 5M | -2.45 | -3.52 | -3.77 | -4.13 | -3.92 | -3.75 | -6.33 | -6.07 |
| MIMO_2 | 30cm | -0.99 | -1.96 | -2.26 | -1.72 | -1.42 | -1.20 | -2.47 | -1.93 |
| | 1M | -1.23 | -2.16 | -2.46 | -2.12 | -1.82 | -1.56 | -2.87 | -2.46 |
| | 2M | -1.53 | -2.53 | -2.86 | -2.62 | -2.37 | -2.14 | -3.50 | -3.18 |
| | 3M | -1.86 | -2.86 | -3.19 | -3.13 | -2.91 | -2.67 | -4.13 | -3.91 |
| | 5M | -2.49 | -3.56 | -3.92 | -4.16 | -3.96 | -3.76 | -5.38 | -5.36 |
| PEAK GAIN (dBi) ||||||||||
| MIMO_1 | 30cm | 3.83 | 3.32 | 1.83 | 4.23 | 4.23 | 4.70 | 4.11 | 3.99 |
| | 1M | 3.63 | 3.12 | 1.63 | 3.83 | 3.83 | 4.30 | 3.71 | 3.36 |
| | 2M | 3.33 | 2.82 | 1.23 | 3.33 | 3.33 | 3.80 | 3.11 | 2.66 |
| | 3M | 3.03 | 2.42 | 0.85 | 2.73 | 2.73 | 3.20 | 2.51 | 1.86 |
| | 5M | 2.33 | 1.72 | 0.15 | 1.73 | 1.73 | 2.10 | 1.31 | 0.46 |
| MIMO_2 | 30cm | 4.86 | 3.06 | 2.81 | 4.41 | 4.67 | 4.56 | 3.95 | 4.15 |
| | 1M | 4.66 | 2.86 | 2.61 | 4.01 | 4.27 | 4.19 | 3.55 | 3.55 |
| | 2M | 4.36 | 2.56 | 2.21 | 3.51 | 3.77 | 3.66 | 2.95 | 2.85 |
| | 3M | 4.06 | 2.16 | 1.91 | 2.99 | 3.17 | 3.06 | 2.35 | 2.15 |
| | 5M | 3.36 | 1.46 | 1.21 | 1.99 | 2.17 | 2.06 | 1.15 | 0.65 |
| IMPEDANCE || 50Ω ||||||||
| POLARIZATION || LINEAR ||||||||
| VSWR || < 3 ||||||||
| CABLE || 1 METER KSR200-P STANDARD, FULLY CUSTOMIZABLE ||||||||
| CONNECTOR || SMA(M) STANDARD, FULLY CUSTOMIZABLE ||||||||

FIG. 3

| 2.4GHz/5GHz WIFI ANTENNA | | | |
|---|---|---|---|
| FREQUENCY (MHz) | | 2400~2500 | 4900~5850 |
| EFFICIENCY (%) | | | |
| MIMO_1 | 30cm | 69.77 | 59.81 |
| | 1M | 63.63 | 51.43 |
| | 2M | 55.42 | 41.67 |
| | 3M | 48.27 | 33.81 |
| | 5M | 36.62 | 22.18 |
| MIMO_2 | 30CM | 70.19 | 59.69 |
| | 1M | 64.01 | 51.32 |
| | 2M | 55.75 | 41.57 |
| | 3M | 48.56 | 33.71 |
| | 5M | 36.84 | 22.12 |
| AVERAGE GAIN (dBi) | | | |
| MIMO_1 | 30cm | -1.57 | -2.27 |
| | 1M | -1.97 | -2.92 |
| | 2M | -2.57 | -3.84 |
| | 3M | -3.17 | -4.75 |
| | 5M | -4.37 | -6.58 |
| MIMO_2 | 30cm | -1.54 | -2.25 |
| | 1M | -1.94 | -2.91 |
| | 2M | -2.54 | -3.82 |
| | 3M | -3.14 | -4.73 |
| | 5M | -4.34 | -6.56 |
| PEAK GAIN (dBi) | | | |
| MIMO_1 | 30cm | 4.77 | 4.86 |
| | 1M | 4.37 | 4.26 |
| | 2M | 3.77 | 3.36 |
| | 3M | 3.17 | 2.46 |
| | 5M | 1.97 | 0.66 |
| MIMO_2 | 30cm | 4.83 | 5.09 |
| | 1M | 4.43 | 4.39 |
| | 2M | 3.83 | 3.49 |
| | 3M | 3.23 | 2.59 |
| | 5M | 2.03 | 0.79 |

FIG. 4

| SATELLITE L BAND 1621MHz | |
|---|---|
| CENTER FREQUENCY | 1621±5 MHz |
| VSWR | < 2 |
| AXIAL RATIO | 3.6 |
| POLARIZATION | RHCP |
| AVERAGE GAIN | -1.76dBi |
| PEAK GAIN | 2.17dBi |
| ANTENNA EFFICIENCY | 66.67% |
| CABLE | 1 METER KSR200-P STANDARD, FULLY CUSTOMIZABLE |
| CONNECTOR | SMA(M) STANDARD, FULLY CUSTOMIZABLE |

FIG. 5

| MECHANICAL | |
|---|---|
| ANTENNA DIMENSIONS | 146*134*20mm |
| CASING | ASA |
| WEIGHT (INCLUDING CABLE) | 438 g |
| INGRESS PROTECTION RATING | IP67 |
| ENVIRONMENTAL | |
| OPERATION TEMPERATURE | -40°C TO 85°C |
| STORAGE TEMPERATURE | -40°C TO 90°C |
| HUMIDITY | NON-CONDENSING 65°C 95% RH |

FIG. 6

MULTI-BAND MIMO PANEL ANTENNAS

CROSS-REFERENCE

This application claims the benefit of U.S. Provisional Application No. 62/383,110, filed Sep. 2, 2016, entitled Multi-Band MIMO Panel Antenna, which application is incorporated herein by reference.

BACKGROUND

In view of continuous improvements within the field of wireless communication technology, the trend in the telecommunication industry is to move to 4th generation, or 4G communication systems, for increased data rate requirements. The improved data rates achieved by 4G communication systems require multiple antennas on one or both ends of the communication link. This Multiple Input Multiple Output (MIMO) protocol and modulation scheme commonly requires multiple antennas operating in the same frequency band to be integrated into portable as well as stationary communication devices. The multiple antennas situated in the portable electronic devices, such as laptop computers, mobile phones, and personal digital assistants (PDAs) must work in unison to receive and transmit multiple data streams. These MIMO antennas are required to maintain high isolation and low pattern correlation for optimum link quality and to achieve the desired high data rates compared to 2G and 3G communication protocols.

Currently, 4G wireless applications demand high speed data uplink and downlink. High efficiency and high gain MIMO antennas are necessary to achieve the required signal to noise ratio and throughput required to solve these challenges. Such antennas must also have high isolation among to prevent self-interference.

Numerous signal bands often require specification and installation of multiple and/or different antennas. What is needed is a single antenna that efficiently covers multiple bands, enabling designers to specify one and only one antenna for all frequencies for Long Term Evolution (LTE), Global Positioning System (GPS)/Global Navigation Satellite System (GLONASS/BeiDou (GNSS)), Satellite Band, and WiFi (IEEE 802.11b wireless networking).

SUMMARY

Disclosed are multi-band panel antennas. Antennas are configurable to deliver Multiple Input Multiple Output (MIMO) coverage technology for worldwide 4G Long Term Evolution (LTE) bands at 698 to 960 MHz/1710 to 2170 MHz/2490 to 2690 MHz/3300 to 3600 MHz, Satellite Band (1-2 GHz), dual-band 2.4/5.8 GHz WiFi, and GNSS (GPS-GLONASS-BeiDou), eliminating the need for multiple antennas. GPS is an acronym for Global Positioning System. GLONASS is an acronym for Globalnaya Navigazionnaya Sputnikovaya Sistema, or Global Navigation Satellite System. GLONASS is Russia's version of GPS. BeiDou is shorthand for BeiDou Navigation Satellite System (or BDS) which is the satellite system developed by the Chinese.

An aspect of the disclosure is directed to multi-band MIMO panel antennas. The multi-band MIMO panel antennas comprise: a housing having a top surface and a bottom surface which encloses multi-band MIMO panel antenna electronics on an interior surface opposite a mounting surface wherein the housing has a plurality of apertures along an exterior surface configurable to engage a plurality of cables separated into two cable entry points. Additionally, one or more pass-through grommets can be provided. The pass through grommets can have an elastomer layer which is breached by the cable during installation. The pass-through grommets are configurable to engage two or more cables. A plurality of apertures on the housing surface are adjacent each other on a side of the housing. The housing is at least one of rectangular and square. In some configurations, there is a first pass-through grommet and a second pass-through grommet. An adhesive layer on an exterior surface to facilitate mounting. Additionally, a plurality of labels can be provided to identify the cable and antenna type. The panel antenna is configurable to provide antenna electronics within the housing that cover 698 to 960 MHz, 1710 to 2170 MHz, 2490 to 2690 MHz, 3300 to 3600 MHz, Satellite Band of 1-2 GHz, and dual-band frequencies of 2.4 GHz and 5.8 GHz. In some configurations, a first aperture engages a first 2/4/5 GHz WiFi coaxial cable, a second aperture engages a GPS-GLONASS-BeiDou coaxial cable, a third aperture engages a first 2G/3G/4G coaxial cable, a fourth aperture engages a second 2G/3G/4G coaxial cable, a fifth aperture engages a satellite band coaxial cable, and a sixth aperture engages a second 2/4/5 GHz WiFi coaxial cable.

Another aspect of the disclosure is directed to multi-band MIMO panel antennas comprising: a housing having a top surface and a bottom surface which encloses multi-band MIMO panel antenna electronics on an interior surface opposite a mounting surface wherein the housing has a plurality of apertures along an exterior surface configurable to engage a plurality of cables separated into two cable entry points; a plurality of cables selected from a 2G/3G/4G coaxial cable, a GPS-GLONASS-BeiDou coaxial cable, a satellite band coaxial cable, and a 2/4/5 GHz WiFi coaxial cable, wherein each of the plurality of cables passes from an interior of the housing to an exterior of the housing through a corresponding aperture of the plurality of apertures. Additionally one or more pass-through grommets can be provided. The pass-through grommets are configurable to engage two or more cables. The plurality of apertures are adjacent each other on a side of the housing. The housing is at least one of rectangular and square. A first pass-through grommet and a second pass-through grommet can be provided. An adhesive layer can be provided on an exterior surface. Additionally, a plurality of labels for the cables can be provided. The panel antenna is configurable to cover 698 to 960 MHz, 1710 to 2170 MHz, 2490 to 2690 MHz, 3300 to 3600 MHz, Satellite Band of 1-2 GHz, and dual-band frequencies of 2.4 GHz and 5.8 GHz.

Still another aspect of the disclosure is directed to kits. Suitable kits comprise: a multi-band MIMO panel antenna comprising a housing having a top surface and a bottom surface which encloses multi-band MIMO panel antenna electronics on an interior surface opposite a mounting surface wherein the housing has a plurality of apertures along an exterior surface configurable to engage a plurality of cables separated into two cable entry points configurable to engage a plurality of cables; and a plurality of cables selected from a 2G/3G/4G coaxial cable, a GPS-GLONASS-BeiDou, a satellite band coaxial cable, and a 2/4/5 GHz WiFi coaxial cable.

INCORPORATION BY REFERENCE

All publications, patents, and patent applications mentioned in this specification are herein incorporated by reference to the same extent as if each individual publication, patent, or patent application was specifically and individually indicated to be incorporated by reference. See, for example:

U.S. Pat. No. 5,936,587 A issued Aug. 10, 1999, to Gudilev et al. for Small antenna for portable radio equipment;

U.S. Pat. No. 6,842,148 B2 issued Jan. 11, 2005, to Hendler et al. for Fabrication method and apparatus for antenna structures in wireless communications devices;

U.S. Pat. No. 7,408,512 B1 issued Aug. 5, 2008, to Rodenbeck, et al. for Antenna with distributed strip and integrated electronic components;

U.S. Pat. No. 7,411,554 B2 issued Aug. 12, 2008, to Jung et al. for MIMO antenna operable in multiband;

U.S. Pat. No. 7,714,795 B2 issued May 11, 2010, to Wen et al. for Multi-band antenna apparatus disposed on a three-dimensional substrate, and associated methodology, for a radio device;

U.S. Pat. No. 8,952,850 B2 issued Feb. 10, 2015, to Park et al. for Mimo antenna apparatus; and U.S. Pat. No. 9,413,069 B2 issued Aug. 9, 2016, to Chieh et al. for Compact, Multi-port WiFi dual band MIMO antenna System.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 2 is a table of antenna and filter specifications for BeiDou-GPS-GLONASS frequencies;

FIG. 3 is a table of antenna specifications for 2G/3G/4G LTE frequencies;

FIG. 4 is a table of antenna specifications for 2.4 GHz/5 GHz WiFi frequencies;

FIG. 5 is a table of antenna specifications for Satellite Band 1621 MHz;

FIG. 6 is a table of mechanical and environmental specifications for an antenna;

DETAILED DESCRIPTION

Described herein are multi-band MIMO panel antennas. The multi-band MIMO panel antennas are configurable to have heavy-duty construction and fully IP67 waterproof, for use in a variety of applications. Suitable applications include internet of things (IoT) gateway and IoT routers, high definition (HD) video streaming, transportation, and remote monitoring applications. The multi-band MIMO panel antennas are designed for simple secure attachment using, for example, 3M® two-sided foam adhesive. Additionally, the multi-band MIMO panel antennas can deliver MIMO coverage technology for worldwide 4G LTE bands at 698 to 960 MHz/1710 to 2170 MHz/2490 to 2690 MHz/3300 to 3600 MHz, Satellite Band, dual-band 2.4/5.8 GHz WiFi, and GNSS (GPS-GLONASS-BeiDou). In addition to L-band, other bands can be used including, for example, K-band, S-band, and C-band. As such the multi-band MIMO panel antenna eliminates the need for device designers to specify multiple antennas.

Figure 1A:
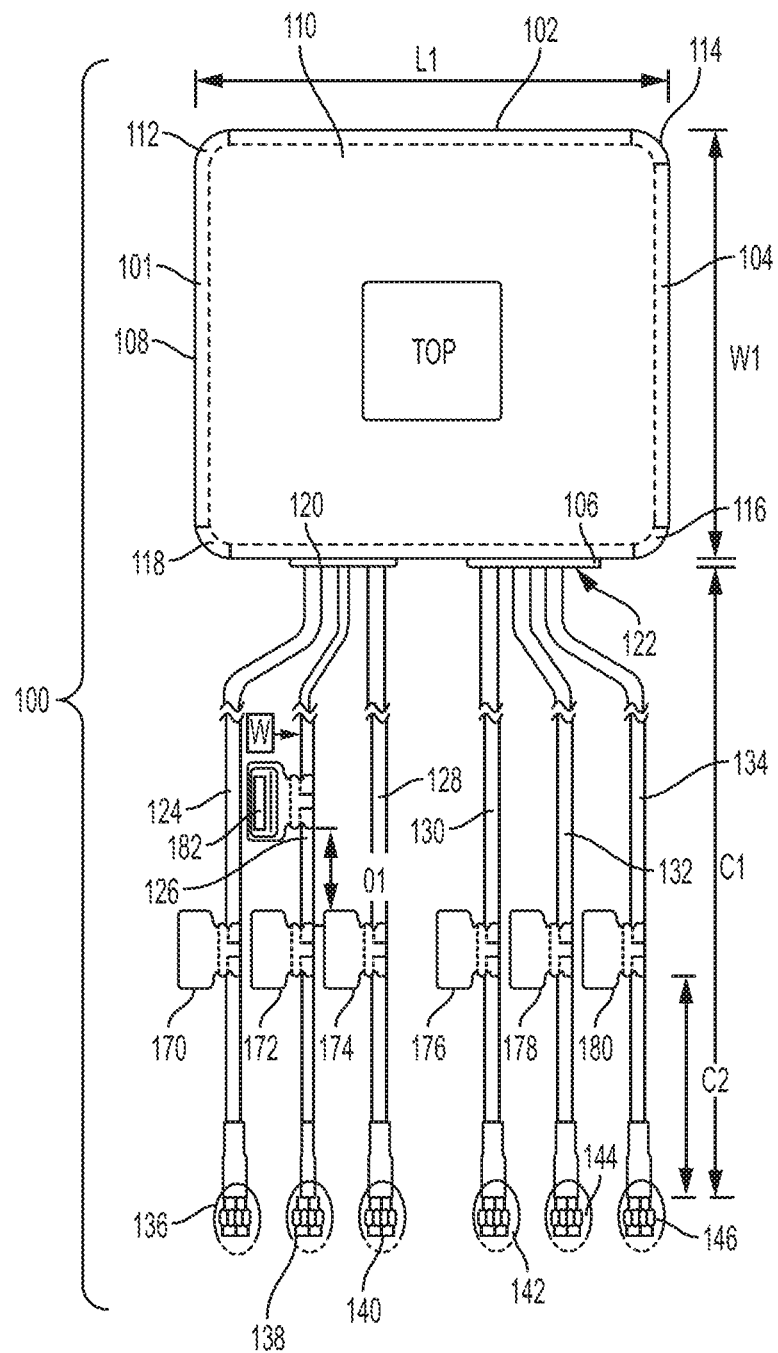
FIG. 1A is a top view of a multi-band panel antenna.
Figure 1B:
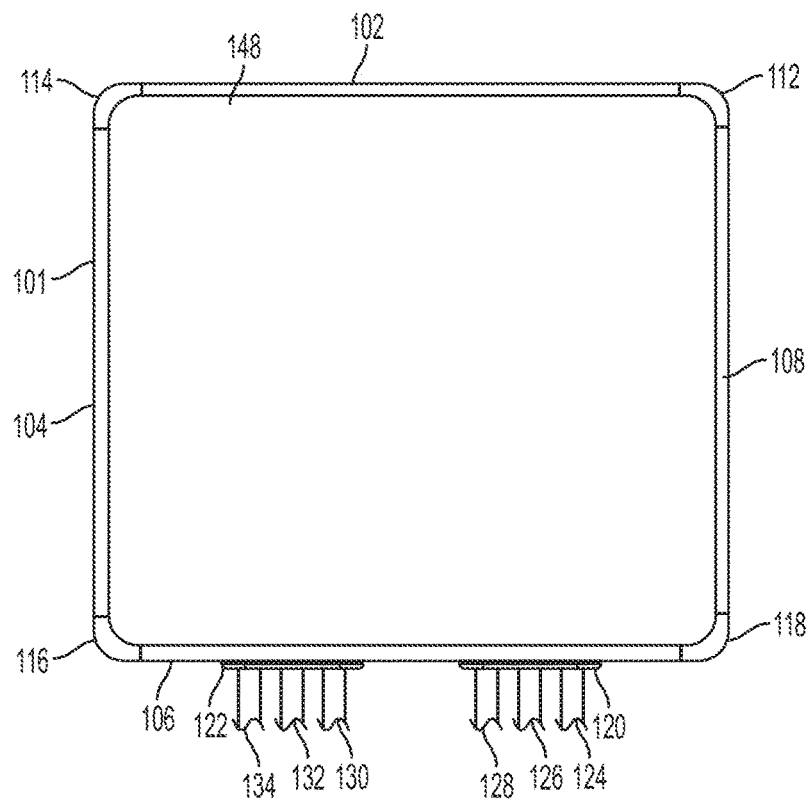
FIG. 1B is a bottom view of an antenna.
Figure 1C:
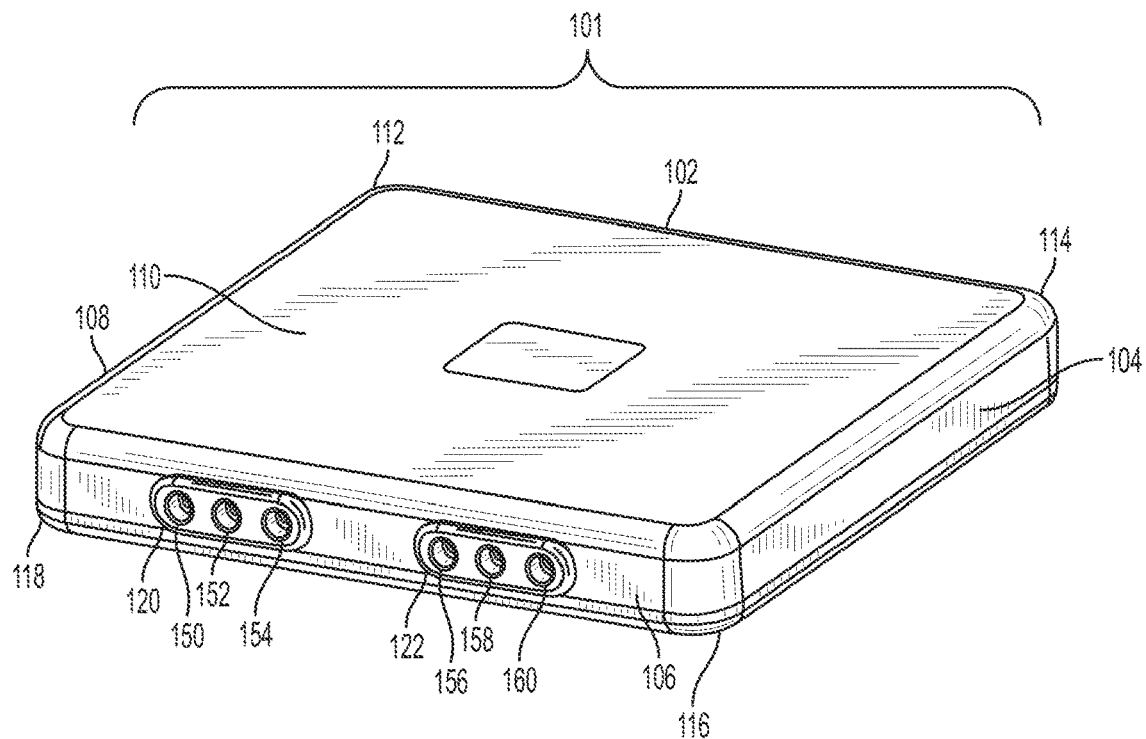
FIG. 1C is a perspective view of a multi-band panel antenna.

FIGS. 1A-C illustrate several different views of an embodiment of a multi-band MIMO panel antenna 100 according to the disclosure. A plurality of antenna elements are positioned on the interior of the enclosure 101 so that the antenna elements are located on the inside of the top surface 110 of the enclosure 101 and away from the interior of the bottom surface 148 of the enclosure 101. By positioning the antenna elements within the enclosure closest to the surface that faces away from the mounting surface, antenna RF performance will be optimized. The device is designed to be mounted on a non-conductive surface (e.g., glass, plastic or composite). However, in some implementations the device is mounted on a conductive surface (e.g., metal). Mounting the device on a conductive surface significantly degrades the antenna RF performance. Constructing the device to create as much space as possible between the antenna elements in the interior of the enclosure and the mounting surface minimizes the performance degradation. An adhesive layer (not shown) can be provided on an exterior surface of the panel antenna 100 so that the panel antenna is mounted so that the electronics inside the antenna are positioned towards the sky. Typically the adhesive layer is positioned on the top surface 110 when the panel antenna is mounted on an interior surface and on the bottom surface 148 when the panel antenna is mounted on an exterior surface.

FIG. 1A is a front view of the multi-band MIMO panel antenna 100 with enclosure 101, or housing, having a primarily rectangular shape of low profile and uniform thickness. Enclosure 101 has a top surface 110 and, as illustrated, has a first side 102, a second side 104, a third side 106 and a fourth side 108, numbered clockwise when viewed from above. Suitable dimensions of the enclosure 101 are a length L1 of about 140-150 mm, a width W1 of 130-140 mm, and a thickness of about 15-25 mm (e.g., height of second side 104). As illustrated, a first arc 112 forms a corner between fourth side 108 and first side 102; second arc 114 forms a corner between first side 102 and second side 104; third arc 116 forms a corner between second side 104 and third side 106; fourth arc 118 forms a corner between third side 106 and fourth side 108. The resulting perimeter of enclosure 101 is that of a rectangle with rounded corners. Additionally, the top surface 110 can be curved towards the side surfaces (102-108). As will be appreciated by those skilled in the art, the electronics and orientation of the electronics positioned within the enclosure 101 can vary.

Along third side 106 are a first cable pass-through grommet 120 and a second cable pass-through grommet 122, numbered sequentially from left to right as viewed from above, each of which provides pass-through for three antenna cables from exterior to the interior of enclosure 101. The two separate coaxial cable entry points of the first cable pass-through grommet 120 and the second cable pass-through grommet 122 balance the pull force of the coaxial cables across a width of the housing where the cable pass-through grommets are positioned. As will be appreciated by those skilled in the art, the cable pass-through grommets are shown positioned along the third side. However, the cable pass-through grommets can be positioned on any surface of the housing without departing from the scope of the disclosure.

A first cable 124, second cable 126, and third cable 128, all pass-through the cable pass-through grommet 120 from left to right as viewed from above. Fourth cable 130, fifth cable 132, and sixth cable 134, all pass-through the cable pass-through grommet 122 from left to right as viewed from above. As will be appreciated by those skilled in the art, cables passing through a particular grommet can be changed without departing from the scope of the disclosure. The quantity, type and location of the coaxial cables can vary widely. The order of thee cables illustrated are an example of an optimal mechanical orientation for efficient construction for a particular antenna configuration. Other cable orientations can be used without departing from the scope of the disclosure. The use of inline rubber plug gaskets creates a water seal between the coaxial cables and the interior of the enclosure 101 (and thus protects the electronics within the housing from moisture). The use of inline rubber plug gaskets also allows for the use of a single enclosure part number for a wide variety of antenna elements and coaxial cable options. This allows for minimum tooling supporting a wide variety of product configurations. The rubber gasket apertures (or holes) can be sealed at one end with, for example, an elastomer layer or membrane. Other sealing material can be used including, for example, silicone or rubber. Sealing the rubber gasket apertures allows a single rubber gasket part number to be used for a wide variety of options by simply pushing a selected coaxial cable through the elastomer membrane. The elastomer membrane may be pierced by the coaxial cable itself or a tool and may self-seal around the exterior of the coaxial cable.

The cables (124-134) are selected from the group comprising RG174 and KSR200-P. Each cable (124-134) has a connection end (136-146) selected from the group comprising: connector type RG174, and connector type KSR200-P.

Each cable (124-134) further includes a label (170-180) which provides identifying information selected from: the type of cable, the type of connector and/or the type of antenna. An additional label 182 can be provided which is empty and/or includes a bar code. Other mechanisms for identifying the cable type and/or antenna can be used without departing from the scope of the disclosure including for example, color coding of the cable and/or connector.

TABLE 1

Exemplar Cables, Connectors and Antennas

| CABLE | CABLE TYPE | CONNECTOR TYPE | ANTENNA |
|---|---|---|---|
| First Cable 124 | KSR200-P | KSR200-P SMA(M) ST | 2G/3G/4G MMO2 |
| Second Cable 126 | RG174 | RG174 SMA(M) | GPS-GLONASS-BEIDU |
| Third Cable 128 | KSR200-P | KSR200-P RP-SMA(M) ST | 2.4/5 GH MMO2 |
| Fourth Cable 130 | KSR200-P | KSR200-P RP-SMA(M) ST | 2.4/5 GH MMO1 |
| Fifth Cable 132 | KSR200-P | KSR200-P SMA(M) ST | L-Band |
| Sixth Cable 134 | KSR200-P | KSR200-P SMA(M) ST | 2G/3G/4G MMO1 |

For attachment to external electronics, first cable has a typical length C1 for each of the cables of about 1 meter. The labels are positionable at a distance of about C2 from the connector end of the cables, where C2 is 65-75 mm. For connection to external electronics each cable is provided with a typical end SubMiniature version A (SMA) connector.

Illustrated in FIG. 1B is a bottom view of enclosure 101. Enclosure 101 has a bottom surface 148 and, as illustrated, has a first side 102, a second side 104, a third side 106 and a fourth side 108, numbered counter-clockwise when viewed from below. As illustrated, first arc 112 resides between first side 102 and fourth side 108; fourth arc 118 resides between fourth side 108 and third side 106; third arc 116 resides between third side 106 and second side 104; second arc 114 resides between second side 104 and first side 102. The resulting perimeter of enclosure 101 is that of a rectangle with rounded corners. Along fourth side 106 are a first cable pass-through grommet 120 and a second cable pass-through grommet 122, numbered sequentially from right to left as viewed from below, each of which provides pass-through for three antenna cables from exterior to the interior of enclosure 101.

First cable 124, second cable 126, and third cable 128, all pass-through the cable pass-through grommet 120 from right to left as viewed from below. Fourth cable 130, fifth cable 132, and sixth cable 134, all the cable pass-through grommet 122 from right to left as viewed from below.

Illustrated in FIG. 1C is a perspective view of enclosure 101. Evident in the illustration is top surface 110, first side 102, second side 104, third side 106, fourth side 108, first arc 112, second arc 114, third arc 116, fourth arc 118, first cable pass-through grommet 120, and second cable pass-through grommet 122, as described in FIGS. 1A-B. First cable pass-through grommet 120, has a plurality of apertures to facilitate connection of cables from the internal antennas to external electronics. First aperture 150, second aperture 152, and third aperture 154 numbered from left to right are illustrated. Second cable pass-through grommet 122, has a plurality of apertures to facilitate connection of cables from the internal antennas to external electronics. Fourth aperture 156, fifth aperture 158, and sixth aperture 160 numbered from left to right are illustrated.

FIG. 2 is a table of antenna and filter specifications for BeiDou-GPS-GLONASS frequencies. It includes specifications for passive antenna, low-noise amplifier and filter electrical properties, and complete specification from antenna through low-noise amplifier and filter. FIG. 3 is a table of antenna specifications for 2G/3G/4G LTE frequencies. It includes efficiency, average gain and peak gain data for each LTE antenna for a variety of cable lengths as well as other data. FIG. 4 is a table of antenna specifications for 2.4 GHz/5 GHz WiFi frequencies. It includes efficiency, average gain and peak gain data for each WiFi antenna for a variety of cable lengths as well as other data. FIG. 5 is a table of antenna specifications for Satellite Band 1621 MHz. It includes axial ratio, polarization, average gain, peak gain and efficiency numbers. FIG. 6 is a table of mechanical and environmental specifications for an antenna according to the disclosure. It includes dimension, weight, operating and storage temperatures. As will be appreciated by those skilled in the art, satellite band can include L-band, K-band, S-band, C-band, and any other band that achieves satellite communication.

Components of the disclosure can be provided in kit form. For example, a multi-band MIMO panel antenna comprising a housing having a top surface and a bottom surface which encloses multi-band MIMO panel antenna electronics having a plurality of apertures along an exterior surface configurable to engage a plurality of cables, wherein a first aperture is configurable to engage a 2G/3G/4G coaxial cable, a second aperture is configurable to engage a GPS-GLONASS-BeiDou coaxial cable, a third aperture is configurable to engage a satellite band coaxial cable, and two or more apertures are configurable a to engage a 2/4/5 GHz WiFi coaxial cable; and a plurality of cables selected from a 2G/3G/4G coaxial cable, a GPS-GLONASS-BeiDou, an L-band coaxial cable, and a 2/4/5 GHz WiFi coaxial cable which are packaged for commercial sale to an end user. Labels can be preinstalled on the cables or provided in the package.

Figure 7A:
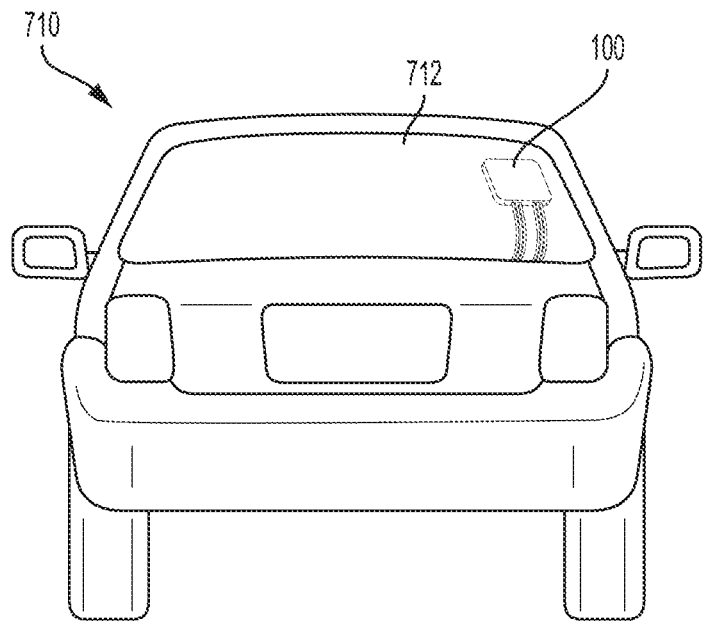
FIG. 7A is a figure of the panel antenna affixed to an interior window of a vehicle.
Figure 7B:
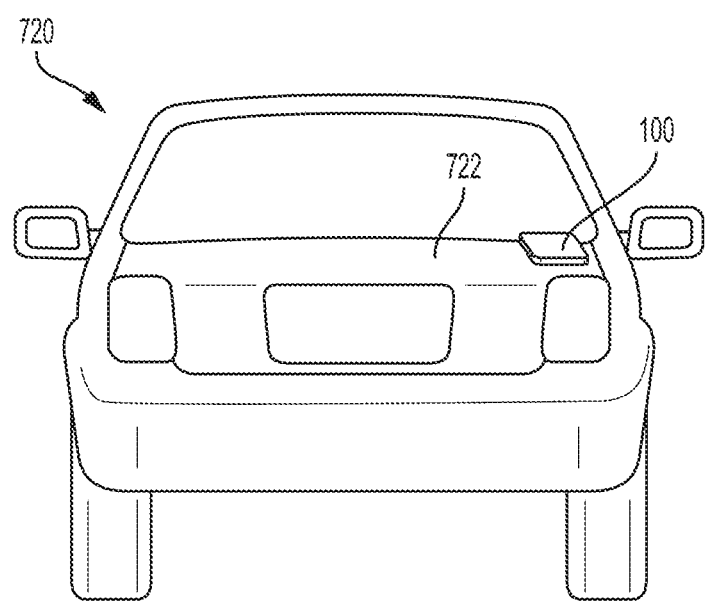
FIG. 7B is a figure of the panel antenna affixed to an exterior surface of a vehicle.

FIG. 7A is a figure of the panel antenna 100 affixed to an interior window of a vehicle 710. The window is a non-conductive surface and the panel antenna is mounted so that the antenna elements within the panel antenna are close to the window 712. FIG. 7B is a figure of the panel antenna 100 affixed to an exterior surface of a vehicle 720 on a conductive surface such as a trunk lid 722. Where the panel antenna 100 is affixed to an exterior surface, the antenna elements inside the panel antenna are positioned away from the conductive surface.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A multi-band MIMO panel antenna comprising:
   a housing, comprising:
     a first wall;
     a second wall opposite the first wall, an external surface of the second wall comprising an external mounting surface for mounting the antenna to an external structure; and
     a plurality of apertures extending through the housing, the plurality of apertures configurable to engage a plurality of cables separated into two cable entry points; and
   multi-band MIMO panel antenna elements enclosed within the housing and supported by an interior surface of the first wall opposite an interior surface of the second wall to maximize a distance between the antenna elements supported by the interior surface of the first wall and the second wall to optimize performance of the antenna elements when the external mounting surface of the antenna is mounted to an external structure comprising a conductive material.

2. The multi-band MIMO panel antenna of claim 1 further comprising a pass-through grommet.

3. The multi-band MIMO panel antenna of claim 2 wherein the pass-through grommet is configurable to engage two or more cables.

4. The multi-band MIMO panel antenna of claim 1 wherein the plurality of apertures are adjacent each other on a single side of the housing.

5. The multi-band MIMO panel antenna of claim 1 wherein the housing is at least one of rectangular and square.

6. The multi-band MIMO panel antenna of claim 1 further comprising a first pass-through grommet and a second pass-through grommet.

7. The multi-band MIMO panel antenna of claim 1 further comprising an adhesive layer on the exterior surface of the second wall.

8. The multi-band MIMO panel antenna of claim 1 further comprising a plurality of labels.

9. The multi-band MIMO panel antenna of claim 1, wherein the antenna is configured to cover a range from 698 to 960 MHz, a range from 1710 to 2170 MHz, a range from 2490 to 2690 MHz, a range from 3300 to 3600 MHz, a Satellite Band of 1-2 GHz, and dual-band frequencies of 2.4 GHz and 5.8 GHz.

10. The multi-band MIMO panel antenna of claim 1, wherein the plurality of apertures include a first aperture configured to engage a first 2/4/5 GHz WiFi coaxial cable, a second aperture configured to engage a GPS-GLONASS-BeiDou coaxial cable, a third aperture configured to engage a first 2G/3G/4G coaxial cable, a fourth aperture configured to engage a second 2G/3G/4G coaxial cable, a fifth aperture configured to engage a satellite band coaxial cable, and a sixth aperture configured to engage a second 2/4/5 GHz WiFi coaxial cable.

11. A multi-band MIMO panel antenna comprising:
    a housing, comprising:
      a first wall;
      a second wall opposite the first wall, an external surface of the second wall comprising an external mounting surface;
      an adhesive layer on the external mounting surface, the adhesive layer configured for use in mounting the antenna to an external structure; and
      a plurality of apertures extending through the housing;
    multi-band MIMO panel antenna elements enclosed within the housing and supported by an interior surface of the first wall opposite an interior surface of the second wall to maximize a distance between the antenna elements supported by the interior surface of the first wall and the second wall to optimize performance of the antenna elements when the external mounting surface of the antenna is mounted to an external structure comprising a conductive material; and
    a plurality of cables, wherein each of the plurality of cables passes from an interior of the housing to an exterior of the housing through a corresponding aperture of the plurality of apertures.

12. The multi-band MIMO panel antenna of claim 11 further comprising a pass-through grommet.

13. The multi-band MIMO panel antenna of claim 12 wherein the pass-through grommet is configurable to engage two or more cables.

14. The multi-band MIMO panel antenna of claim 11 wherein the plurality of apertures are adjacent each other on a single side of the housing.

15. The multi-band MIMO panel antenna of claim 11 wherein the housing is at least one of rectangular and square.

16. The multi-band MIMO panel antenna of claim 11 further comprising a first pass-through grommet and a second pass-through grommet.

17. The multi-band MIMO panel antenna of claim 11 wherein the plurality of cables are selected from the group consisting of a 2G/3G/4G coaxial cable, a GPS-GLONASS-BeiDou coaxial cable, a satellite band coaxial cable, and a 2/4/5 GHz WiFi coaxial cable.

18. The multi-band MIMO panel antenna of claim 11, wherein the antenna is configured to cover a range from 698 to 960 MHz, a range from 1710 to 2170 MHz, a range from 2490 to 2690 MHz, a range from 3300 to 3600 MHz, a Satellite Band of 1-2GHz, and dual-band frequencies of 2.4 GHz and 5.8 GHz.

19. An installed multi-band MIMO panel antenna, the antenna comprising:
    a housing, comprising:
      a first wall;

a second wall opposite the first wall, an external surface of the second wall comprising an external mounting surface, the antenna mounted to a conductive external structure with the external mounting surface proximate the conductive external structure; and a plurality of apertures extending through the housing;

multi-band MIMO panel antenna elements enclosed within the housing and supported by an interior surface of the first wall opposite an interior surface of the second wall to maximize a distance between the antenna elements supported by the interior surface of the first wall and the second wall to minimize performance degradation of the antenna elements due to the conductive external structure to which the external mounting structure of the antenna is mounted; and a plurality of cables, wherein each of the plurality of cables passes from an interior of the housing to an exterior of the housing through a corresponding aperture of the plurality of apertures, each of the plurality of cables selected from the group consisting of a 2G/3G/4G coaxial cable, a GPS-GLONASS-BeiDou, a satellite band coaxial cable, and a 2/4/5 GHz WiFi coaxial cable.

20. The installed antenna of claim 19, wherein the conductive external structure comprises a metallic material.

* * * * *